United States Patent
Takahagi et al.

(10) Patent No.: US 9,899,639 B2
(45) Date of Patent: Feb. 20, 2018

(54) PACKAGING MATERIAL FOR CELL

(71) Applicant: DAI NIPPON PRINTING CO., LTD., Tokyo (JP)

(72) Inventors: Atsuko Takahagi, Tokyo (JP); Rikiya Yamashita, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 0 days.

(21) Appl. No.: 15/100,805

(22) PCT Filed: Dec. 10, 2014

(86) PCT No.: PCT/JP2014/082643
§ 371 (c)(1),
(2) Date: Jun. 1, 2016

(87) PCT Pub. No.: WO2015/087901
PCT Pub. Date: Jun. 18, 2015

(65) Prior Publication Data
US 2016/0308174 A1      Oct. 20, 2016

(30) Foreign Application Priority Data

Dec. 11, 2013 (JP) ................................ 2013-256145

(51) Int. Cl.
*H01M 2/02* (2006.01)
*B32B 15/08* (2006.01)
(Continued)

(52) U.S. Cl.
CPC ............. *H01M 2/0287* (2013.01); *B32B 7/12* (2013.01); *B32B 15/08* (2013.01); *B32B 15/088* (2013.01);
(Continued)

(58) Field of Classification Search
CPC .................................. H01M 4/366; H01M 4/13
See application file for complete search history.

(56) References Cited

U.S. PATENT DOCUMENTS

2012/0268073 A1* 10/2012 Morioka ................ B21D 13/04
                                                                    320/128
2015/0155531 A1    6/2015 Takahagi et al.

FOREIGN PATENT DOCUMENTS

JP        2004-311227 A    11/2004
JP        2006-236938 A     9/2006
(Continued)

OTHER PUBLICATIONS

Mar. 17, 2015 International Search Report issued in International Patent Application No. PCT/JP2014/082643.
(Continued)

*Primary Examiner* — Olatunji Godo
(74) *Attorney, Agent, or Firm* — Oliff PLC (57) ABSTRACT

A technique relates to a packaging material for a battery, including a laminate of film form including at least a base material layer, an adhesive layer, a metal layer, and a sealant layer, laminated in that order, the packaging material being resistant to cracks or pinholes occurring during molding, and having exceptional moldability. The packaging material for a battery is characterized by including a laminate of at least a base material layer, an adhesive layer, a metal layer, and a sealant layer, laminated in that order, the metal layer being aluminum foil having 0.2% proof stress of 55-140 N/mm² when subjected to tensile testing in a parallel direction to the rolling direction, and the ratio of thickness of the base material layer and the metal layer (base material layer thickness:metal layer thickness) being within the range 1:1 to 1:3.

9 Claims, 1 Drawing Sheet (51) Int. Cl.
*B32B 7/12* (2006.01)
*B32B 15/20* (2006.01)
*B32B 27/34* (2006.01)
*B32B 27/36* (2006.01)
*B32B 15/088* (2006.01)
*B32B 15/09* (2006.01)
*H01M 10/0525* (2010.01)
*H01M 10/052* (2010.01)

(52) U.S. Cl.
CPC .............. *B32B 15/09* (2013.01); *B32B 15/20* (2013.01); *B32B 27/34* (2013.01); *B32B 27/36* (2013.01); *H01M 2/026* (2013.01); *H01M 2/0262* (2013.01); *H01M 2/0277* (2013.01); *H01M 2/0285* (2013.01); *H01M 10/0525* (2013.01); *B32B 2439/00* (2013.01); *B32B 2457/00* (2013.01); *B32B 2457/10* (2013.01); *B32B 2605/00* (2013.01); *H01M 10/052* (2013.01); *H01M 2002/0297* (2013.01); *H01M 2220/20* (2013.01); *H01M 2220/30* (2013.01)

(56) References Cited

FOREIGN PATENT DOCUMENTS

| | | |
|---|---|---|
| JP | 2008-287971 A | 11/2008 |
| JP | 2014-065956 A | 4/2014 |
| JP | 2014-101559 A | 6/2014 |
| WO | 2012/036181 A1 | 3/2012 |
| WO | 2013/183511 A1 | 12/2013 |

OTHER PUBLICATIONS

Tetsu Ota; "Press processing engineering manual;" Nikkan Kogyo Shimbun, Ltd.; Jul. 30, 1981; pp. 1-3.

Dec. 5, 2017 Office Action issued in Japanese Patent Application No. 2015-552476.

\* cited by examiner

PACKAGING MATERIAL FOR CELL

TECHNICAL FIELD

The present invention relates to a battery packaging material having excellent moldability with pinholes and cracks hardly generated during molding.

BACKGROUND ART

Various types of batteries have been developed heretofore, and in every battery, a packaging material is an essential member for sealing battery elements such as an electrode and an electrolyte. Metallic packaging materials have been often used heretofore as battery packagings.

On the other hand, in recent years, batteries have been required to be diversified in shape and to be thinned and lightened with improvement of performance of electric cars, hybrid electric cars, personal computers, cameras, mobile phones and so on. However, metallic battery packaging materials that have often been heretofore used have the disadvantage that it is difficult to keep up with diversification in shape, and there is a limit on weight reduction.

Thus, in recent years, there has been proposed a film-shaped laminate with a base material, a metal layer and a sealant layer laminated in this order has been proposed as a battery packaging material which is easily processed into diversified shapes and is capable of achieving thickness reduction and weight reduction. However, such a film-shaped packaging material is thinner as compared to a metallic packaging material, and has the disadvantage that pinholes and cracks are easily generated during molding. If pinholes and cracks are generated in a battery packaging material, an electrolytic solution may permeate to a metal layer to form a metal precipitate, resulting in occurrence of a short-circuit, and therefore it is absolutely necessary that a film-shaped battery packaging material have a property that makes it hard to generate pinholes during molding, i.e. excellent moldability.

Various studies have been conducted heretofore with attention paid to an adhesive layer for bonding a metal layer in order to improve the moldability of a film-shaped battery packaging material. For example, Patent Document 1 discloses that in a laminated packaging material which includes an inner layer including a resin film; a first adhesive agent layer; a metal layer; a second adhesive agent layer; and an outer layer including a resin film, at least one of the first adhesive agent layer and the second adhesive agent layer is formed of an adhesive composition containing a resin having an active hydrogen group on the side chain, a polyfunctional isocyanate and a polyfunctional amine compound, a packaging material having high reliability in deeper molding is obtained.

As represented by Patent Document 1, many studies have been conducted heretofore on techniques for improving moldability with attention paid to blended components of an adhesive layer for bonding a metal layer and other layer in a battery packaging material including a film-shaped laminate, but there have been few reports techniques for improving moldability with attention paid to the properties of a metal layer.

It is known that generally, a metal material having a low yield strength and a large tensile strength is not only easily deformed, but also hardly creased in deep drawing, and thus has excellent processability (see Non-Patent Document 1), and heretofore, a metal raw material having a low yield strength has been generally employed as a metal layer in a battery packaging material including a film-shaped laminate.

PRIOR ART DOCUMENTS

Patent Document

Patent Document 1: Japanese Patent Laid-open Publication No. 2008-287971

Non-Patent Document

Non-Patent Document 1: Tetsu Ota, "Press Processing Technical Manual", published by THE NIKKAN KOGYO SHIMBUN, LTD., issued on Jul. 30, 1981, pages 1 to 3

SUMMARY OF THE INVENTION

Problems to be Solved by the Invention

An object of the present invention is to provide the following technique: a battery packaging material including a film-shaped laminate in which at least a base material layer, an adhesive layer, a metal layer and a sealant layer are laminated in this order has excellent moldability with cracks and pinholes hardly generated during molding.

Means for Solving the Problems

The present inventors have extensively conducted studies for achieving the object, and resultantly found that in a battery packaging material which includes as a metal layer an aluminum foil having a high yield strength with a 0.2% yield strength of 55 to 140 N/mm$^2$ when a tensile test is conducted in a direction parallel to a rolling direction and in which the ratio of the thickness of a base material layer to the thickness of the metal layer is set in a specific range, outstandingly excellent moldability can be imparted to the battery packaging material surprisingly, so that the ratio of generation of pinholes and cracks during molding can be considerably reduced, although in conventional techniques, an aluminum foil to be used as a metal layer is considered to be more excellent in processability as its yield strength decreases. The present invention has been completed by further conducting studies based on the above-mentioned findings.

That is, the present invention provides a battery packaging material and a battery of the following aspects.

Item 1. A battery packaging material including a laminate in which at least a base material layer, an adhesive layer, a metal layer and a sealant layer are laminated in this order, wherein the metal layer is an aluminum foil having a 0.2% yield strength of 55 to 140 N/mm$^2$ when a tensile test is conducted in a direction parallel to a rolling direction, and the ratio of the thickness of the base material layer to the thickness of the metal layer (thickness of base material layer:thickness of metal layer) is in the range of 1:1 to 1:3.

Item 2. The battery packaging material according to item 1, wherein the base material layer is formed of at least one of a polyester resin and a polyamide resin.

Item 3. The battery packaging material according to item 1 or 2, wherein the aluminum foil has a 0.2% yield strength of 55 to 140 N/mm$^2$ when a tensile test is conducted in a direction vertical to a rolling direction.

Item 4. The battery packaging material according to any one of items 1 to 3, wherein the aluminum foil has a 0.2% yield strength of 55 to 140 N/mm² when a tensile test is conducted in a direction at 45° to a rolling direction.

Item 5. The battery packaging material according to any one of items 1 to 4, wherein at least one surface of the metal layer is subjected to a chemical conversion treatment.

Item 6. The battery packaging material according to any one of items 1 to 5, wherein the battery packaging material is a packaging material for a secondary battery.

Item 7. A battery, wherein a battery element including at least a positive electrode, a negative electrode and an electrolyte is stored in the battery packaging material according to any one of items 1 to 6.

Item 8. Use, as a battery packaging material, of a laminate in which at least a base material layer, an adhesive layer, a metal layer and a sealant layer are laminated in this order, wherein the metal layer is an aluminum foil having a 0.2% yield strength of 55 to 140 N/mm² when a tensile test is conducted in a direction parallel to a rolling direction, and the ratio of the thickness of the base material layer to the thickness of the metal layer (thickness of base material layer:thickness of metal layer) is in the range of 1:1 to 1:3.

Item 9. A method for producing a battery, the method including the step of: storing in a battery packaging material a battery element including at least a positive electrode, a negative electrode and an electrolyte, the battery packaging material including a laminate in which at least a base material layer, an adhesive layer, a metal layer and a sealant layer are laminated in this order, wherein the metal layer is an aluminum foil having a 0.2% yield strength of 55 to 140 N/mm² when a tensile test is conducted in a direction parallel to a rolling direction, and the ratio of the thickness of the base material layer to the thickness of the metal layer (thickness of base material layer:thickness of metal layer) is in the range of 1:1 to 1:3.

Advantages of the Invention

In a battery packaging material according to the present invention, a metal layer can properly follow the shape of a mold during molding, so that generation of pinholes, cracks and the like can be suppressed. Thus, the battery packaging material according to the present invention has excellent moldability, and therefore can contribute to improvement of productivity.

EMBODIMENTS OF THE INVENTION

A battery packaging material according to the present invention includes a laminate in which at least a base material layer, an adhesive layer, a metal layer and a sealant layer are laminated in this order, wherein the metal layer is an aluminum foil having a 0.2% yield strength of 55 to 140 N/mm² when a tensile test is conducted in a direction parallel to a rolling direction, and the ratio of the thickness of the base material layer to the thickness of the metal layer (thickness of base material layer:thickness of metal layer) is in the range of 1:1 to 1:3. Hereinafter, the battery packaging material according to the present invention will be described in detail.

1. Laminated Structure of Battery Packaging Material

Figure 1:
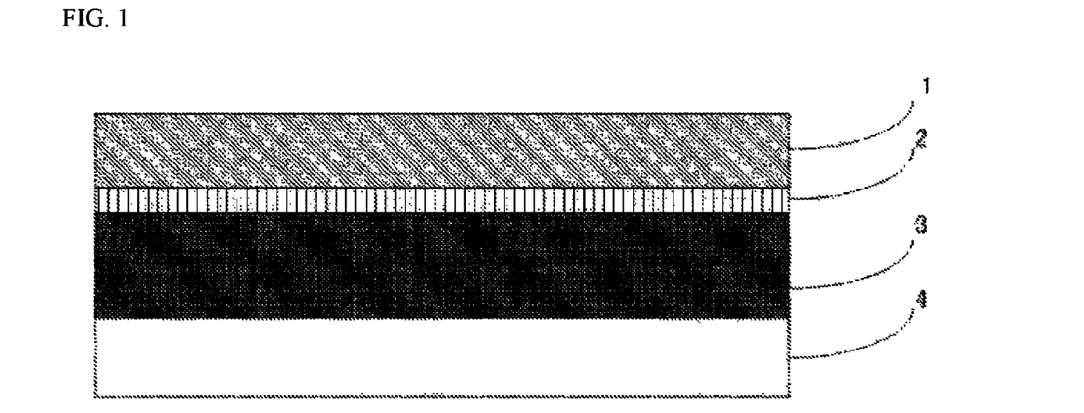
FIG. 1 is a drawing showing one example of a cross-sectional structure of a battery packaging material according to the present invention.

The battery packaging material includes a laminate in which at least a base material layer 1, an adhesive layer 2, a metal layer 3 and a sealant layer 4 are laminated in this order as shown in FIG. 1. In the battery packaging material according to the present invention, the base material layer 1 is an outermost layer, and the sealant layer 4 is an innermost layer. That is, at the time of assembling a battery, the sealant layer 4 situated on the periphery of a battery element is heat-sealed with itself to hermetically seal the battery element, so that the battery element is encapsulated.

Figure 2:
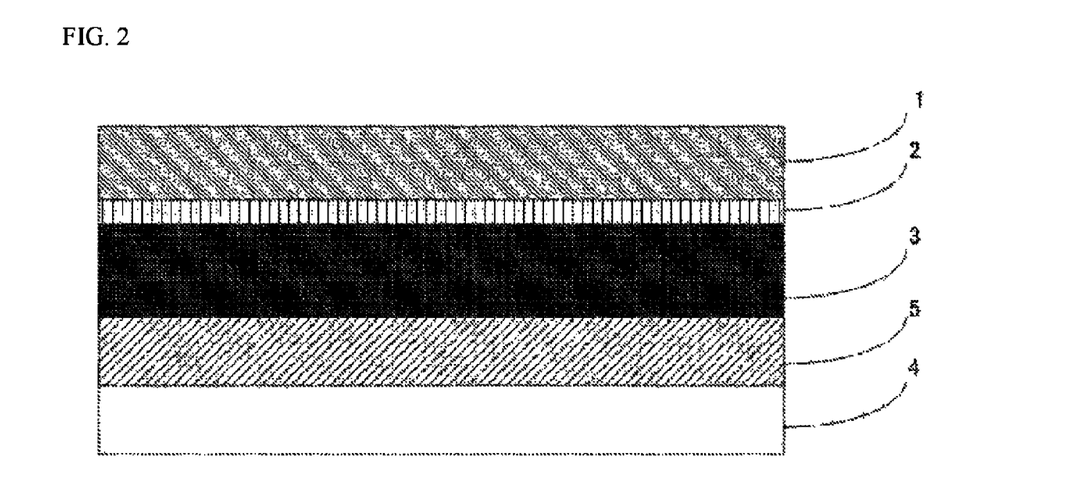
FIG. 2 is a drawing showing one example of a cross-sectional structure of a battery packaging material according to the present invention.

As shown in FIG. 2, the battery packaging material according to the present invention may be provided with an adhesive layer 5 between the metal layer 3 and the sealant layer 4 as necessary in order to improve adhesion between these layers.

2. Compositions of Layers that Form Battery Packaging Material

[Base Material Layer 1]

In the battery packaging material according to the present invention, the base material layer 1 is a layer that forms the outermost layer. The material that forms the base material layer 1 is not particularly limited as long as it has insulation quality. Examples of the material that forms the base material layer 1 include resin films of polyester resin, polyamide resin, epoxy resin, acrylic resin, fluororesin, polyurethane resin, silicon resin, phenol resin and mixtures and copolymers thereof. Among them, polyester resins and polyamide resins are preferred, and biaxially stretched polyester resins and biaxially stretched polyamide resins are more preferred. Specific examples of the polyester resin include polyethylene terephthalate, polybutylene terephthalate, polyethylene naphthalate, polybutylene naphthalate, copolyester and polycarbonate. Specific examples of the polyamide resin include nylon 6, nylon 6,6, copolymer of nylon 6 and nylon 6,6, nylon 6,10, and polymethaxylyleneadipamide (MXD6).

The tensile rupture strength of the base material layer 1 (resin film that forms the base material layer 1) in the machine direction (MD direction) is preferably 200 to 400 MPa, more preferably 250 to 330 MPa. The tensile rupture strength of the base material layer 1 in a direction (TD) vertical to the MD direction is preferably 220 to 400 MPa, more preferably 280 to 350 MPa. When the tensile rupture strength of the base material layer 1 is in a range as described above, generation of pinholes and cracks during molding of the battery packaging material according to the present invention can be further effectively suppressed to improve moldability. The tensile yield strength of the base material layer 1 is a value obtained by performing measurement using a method conforming to JIS K7127.

The tensile rupture elongation of the base material layer 1 in the MD direction is preferably 70 to 150%, more preferably 90 to 130%. The tensile rupture elongation of the base material layer 1 in the TD direction is preferably 70 to 140%, more preferably 90 to 120%. When the tensile rupture elongation of the base material layer 1 is in a range as described above, generation of pinholes and cracks during molding of the battery packaging material according to the present invention can be further effectively suppressed to improve moldability. The tensile yield elongation of the base material layer 1 is a value obtained by performing measurement using a method conforming to JIS K7127.

The base material layer 1 may be formed of a single layer resin film, or may be formed of a resin film having two or more layers for improving pinhole resistance and insulation quality. When the base material layer 1 is to be formed from a multilayer resin film, two or more resin films can be laminated together with an adhesive interposed therebetween, and the kind, amount and so on of the adhesive to be used are similar to those for the later-described adhesive layer 2 or adhesive layer 5.

While the thickness of the base material layer 1 is not particularly limited as long as the ratio of the thickness of the base material layer to the thickness of the later-described metal layer 3 (thickness of base material layer 1:thickness of metal layer) is in the range of 1:1 to 1:3, it is, for example, 7 to 50 μm, preferably 12 to 25

[Adhesive Layer 2]

In the battery packaging material according to the present invention, the adhesive layer 2 is a layer provided between the base material layer 1 and the metal layer 3 for strongly bonding these layers.

The adhesive layer 2 is formed from an adhesive capable of bonding the base material layer 1 and the metal layer 3. The adhesive used for forming the adhesive layer 2 may be a two-liquid curable adhesive resin, or may be a one-liquid curable adhesive resin. Further, the adhesion mechanism of the adhesive used for forming the adhesive layer 2 is not particularly limited, and may be any one of a chemical reaction type, a solvent volatilization type, a heat melting type, a heat pressing type and so on.

Specific examples of the adhesive component that can be used for forming the adhesive layer 2 include polyester-based resins such as polyethylene terephthalate, polybutylene terephthalate, polyethylene naphthalate, polybutylene naphthalate, polyethylene isophthalate, polycarbonate and copolymerized polyester; polyether-based adhesives; polyurethane-based adhesives; epoxy-based resins; phenol resin-based resins; polyamide-based resins such as nylon 6, nylon 66, nylon 12 and copolymerized polyamide; polyolefin-based resins such as polyolefins, carboxylic acid-modified polyolefins and metal-modified polyolefins, polyvinyl acetate-based resins; cellulose-based adhesives; (meth) acryl-based resins; polyimide-based resins; amino resins such as urea resins and melamine resins; rubbers such as chloroprene rubber, nitrile rubber and styrene-butadiene rubber; and silicone-based resins. These adhesive components may be used alone, or may be used in combination of two or more thereof. Among these adhesive components, polyurethane-based adhesives are preferred.

The thickness of the adhesive layer 2 is, for example, 1 to 10 μm, preferably 2 to 5 μm.

[Metal Layer 3]

In the battery packaging material according to the present invention, the metal layer 3 is a layer which is intended to improve the strength of the packaging material, and also functions as a barrier layer for preventing ingress of water vapor, oxygen, light and the like into the battery. In the battery packaging material according to the present invention, the metal layer 3 is formed of an aluminum foil having a 0.2% yield strength of 55 to 140 N/mm² when a tensile test is conducted in a direction (MD) parallel to a rolling direction. In the present invention, an aluminum foil having a high yield is used as the metal layer 3 as describe above, and the ratio of the thickness of the base material layer 1 to the thickness of the metal layer 3 is set in the range of 1:1 to 1:3, so that elongation of the metal layer 3 during molding of the battery packaging material can be properly controlled by the base material layer 1 to effectively suppress the metal layer 3 from being partially thinned. Accordingly, excellent moldability can be imparted to the battery packaging material. When the thickness of the metal layer 3 is excessively large in comparison with the base material layer 1, the metal layer 3 is easily elongated during molding of the battery packaging material, and thus the metal layer 3 is partially thinned, so that pinholes are easily generated. When the thickness of the metal layer 3 is excessively small in comparison with the base material layer 1, the metal layer 3 is hardly elongated during molding of the battery packaging material, and thus moldability is deteriorated.

In the battery packaging material according to the present invention, the ratio of the thickness of the base material layer 1 to the thickness of the metal layer 3 is preferably 1.0:1.1 to 1.0:2.7, more preferably 1.0:1.5 to 1.0:2.5, further preferably 1.0:1.6 to 1.0:2.3.

The aluminum foil to be used as the metal layer 3 may have a 0.2% yield strength of 55 to 140 N/mm² when a tensile test is conducted in a direction (MD) parallel to a rolling direction, but the 0.2% yield strength is preferably 65 to 90 N/mm² for imparting further excellent moldability.

While the 0.2% yield strength of the aluminum foil when a tensile test is conducted in a direction (TD) vertical to a rolling direction is not particularly limited, it is, for example, 55 to 140 N/mm², preferably 65 to 90 N/mm².

While the 0.2% yield strength of the aluminum foil when a tensile test is conducted in a direction at 45° to a rolling direction is not particularly limited, it is, for example, 55 to 140 N/mm², preferably 65 to 90 N/mm².

While the tensile rupture strength of the aluminum foil when a tensile test is conducted in a direction (MD) parallel to a rolling direction is not particularly limited, it is, for example, 90 to 130 N/mm², preferably 95 to 125 N/mm², further preferably 100 to 110 N/mm². When the aluminum foil has a tensile rupture strength as described above, excellent moldability can be further effectively imparted.

While the tensile rupture strength of the aluminum foil when a tensile test is conducted in a direction (TD) vertical to a rolling direction is not particularly limited, it is, for example, 90 to 124 N/mm², preferably 94 to 110 N/mm², further preferably 96 to 105 N/mm². When the aluminum foil has a tensile rupture strength as described above, excellent moldability can be further effectively imparted.

While the tensile rupture strength of the aluminum foil when a tensile test is conducted in a direction at 45° to a rolling direction is not particularly limited, it is, for example, 90 to 124 N/mm², preferably 94 to 110 N/mm², further preferably 96 to 105 N/mm². When the aluminum foil has a tensile rupture strength as described above, excellent moldability can be further effectively imparted.

The 0.2% yield strength, tensile rupture strength and tensile rupture elongation of the metal layer 3 are measured by a tensile test (total elongation method) defined in JIS Z 2241.

The aluminum foil to be used as the metal layer 3 may be a foil of pure aluminum alone as long as it has the above-described 0.2% yield strength, but an aluminum alloy is preferred. Examples of the aluminum alloy to be used in the aluminum foil include aluminum-Fe-based alloys, aluminum-Mn-based alloys, with aluminum-Fe-based alloys being preferred. Preferred examples of the aluminum foil to be used as the metal layer 3 include foils of soft aluminum, for example annealed aluminum (JIS A8021H-O) or (JIS A8079H-O).

An aluminum foil having the above-mentioned properties is known, and a method for production thereof is also known. Specifically, an aluminum foil having the properties can be produced by passing through the steps of: homogenizing an aluminum metal or aluminum alloy at about 500 to 600° C. for about 1 to 2 hours; hot-rolling the aluminum metal or aluminum alloy at about 400 to 500° C.; cold-rolling the aluminum metal or aluminum alloy; subjecting the aluminum metal or aluminum alloy to intermediate annealing at about 300 to 450° C. for about 1 to 10 hours; cold-rolling the aluminum metal or aluminum alloy; and subjecting the aluminum metal or aluminum alloy to final annealing at about 250 to 400° C. for about 30 to 100 hours.

While the thickness of the metal layer 3 is not particularly limited as long as the ratio of the thickness of the base material layer 1 to the thickness of the metal layer 3 (thickness of base material layer 1:thickness of metal layer) is in the range of 1:1 to 1:3, it is, for example, 10 to 80 μm, preferably 25 to 50 μm.

The metal layer 3 is subjected to a chemical conversion treatment on at least either one face, preferably on both faces for the purpose of stabilizing adhesion and preventing dissolution or corrosion. Here, the chemical conversion treatment is a treatment for forming an acid resistance film on the surface of the metal layer. Examples of the chemical conversion treatment include a chromic acid chromate treatment using a chromic acid compound such as chromium nitrate, chromium fluoride, chromium sulfate, chromium acetate, chromium oxalate, chromium biphosphate, acetylacetate chromate, chromium chloride or chromium potassium sulfate; a phosphoric acid chromate treatment using a phosphoric acid compound such as sodium phosphate, potassium phosphate, ammonium phosphate or polyphosphoric acid; and a chromate treatment using an aminated phenol polymer formed of repeating units represented by the following general formulae (1) to (4). In the aminated phenol polymer, the repeating units represented by the following general formulae (1) to (4) may be contained alone, or may be contained in combination of two or more thereof

[Chemical Formula 1]

(1)

[Chemical Formula 2]

(2)

[Chemical Formula 3]

(3)

[Chemical Formula 4]

(4)

In the general formulae (1) to (4), X represents a hydrogen atom, a hydroxyl group, an alkyl group, a hydroxyalkyl group, an allyl group or a benzyl group. $R^1$ and $R^2$ are the same or different, and each represent a hydroxyl group, an alkyl group or a hydroxyalkyl group. In the general formulae (1) to (4), examples of the alkyl group represented by X, $R^1$ and $R^2$ include linear or branched alkyl groups with 1 to 4 carbon atoms, such as a methyl group, an ethyl group, a n-propyl group, an isopropyl group, a n-butyl group, an isobutyl group and a tert-butyl group. Examples of the hydroxyalkyl group represented by X, $R^1$ and $R^2$ include linear or branched alkyl groups having 1 to 4 carbon atoms, which is substituted with one hydroxy group, such as a hydroxymethyl group, a 1-hydroxyethyl group, a 2-hydroxyethyl group, a 1-hydroxypropyl group, a 2-hydroxypropyl group, a 3-hydroxypropyl group, a 1-hydroxybutyl group, a 2-hydroxybutyl group, a 3-hydroxybutyl group and a 4-hydroxybutyl group. In the general formulae (1) to (4), X is preferably any one of a hydrogen atom, a hydroxyl group, and a hydroxyalkyl group. The number average molecular weight of the aminated phenol polymer formed of repeating units represented by the general formulae (1) to (4) is, for example, about 500 to about 1000000, preferably about 1000 to about 20000.

Examples of the chemical conversion treatment method for imparting corrosion resistance to the metal layer 3 include a method in which the metal layer 3 is coated with a dispersion of fine particles of a metal oxide such as aluminum oxide, titanium oxide, cerium oxide or tin oxide or barium sulfate in phosphoric acid, and annealed at 150° C. or higher to form a corrosion resistance treatment layer on the surface of the metal layer 3. A resin layer with a cationic polymer crosslinked with a crosslinking agent may be formed on the corrosion resistance treatment layer. Here, examples of the cationic polymer include polyethyleneimine, ion polymer complexes formed of a polymer having polyethyleneimine and a carboxylic acid, primary amine-grafted acrylic resins obtained by grafting a primary amine to an acrylic main backbone, polyallylamine or derivatives thereof, and aminophenol. These cationic polymers may be used alone, or may be used in combination of two or more thereof. Examples of the crosslinking agent include compounds having at least one functional group selected from the group consisting of an isocyanate group, a glycidyl group, a carboxyl group and an oxazoline group, and silane coupling agents. These crosslinking agents may be used alone, or may be used in combination of two or more thereof.

These chemical conversion treatments may be performed alone, or may be performed in combination of two or more thereof. The chemical conversion treatments may be performed using one compound alone, or may be performed using two or more compounds in combination. Among them, a chromic acid chromate treatment is preferred, and a chromate treatment using a chromic acid compound, a phosphoric acid compound and the aminated phenol polymer in combination is further preferred.

The amount of the acid resistant film to be formed on the surface of the metal layer 3 in the chemical conversion treatment is not particularly limited, but for example, when a chromate treatment is performed using a chromic acid compound, a phosphoric acid compound and the aminated phenol polymer in combination, it is desirable that the chromic acid compound be contained in an amount of about 0.5 to about 50 mg, preferably about 1.0 to about 40 mg, in terms of chromium, the phosphorus compound be contained in an amount of about 0.5 to about 50 mg, preferably about 1.0 to about 40 mg, in terms of phosphorus, and the aminated phenol polymer be contained in an amount of about 1 to about 200 mg, preferably about 5.0 to 150 mg, per 1 $m^2$ of the surface of the metal layer.

The chemical conversion treatment is performed in the following manner: a solution containing a compound to be used for formation of an acid resistance film is applied to the surface of the metal layer by a bar coating method, a roll coating method, a gravure coating method, an immersion method or the like, and heating is then performed so that the temperature of the metal layer is about 70 to 200° C. The metal layer may be subjected to a degreasing treatment by an alkali immersion method, an electrolytic cleaning method, an acid cleaning method, an electrolytic acid cleaning method or the like before the metal layer is subjected to the chemical conversion treatment. When a degreasing treatment is performed as described above, the chemical conversion treatment of the surface of the metal layer can be further efficiently performed.

[Sealant Layer 4]

In the battery packaging material according to the present invention, the sealant layer 4 corresponds to the innermost layer, and during construction of a battery, the sealant layers are heat-welded to each other to hermetically seal the battery element.

The resin component to be used in the sealant layer 4 is not particularly limited as long as it can be heat-welded, and examples thereof include polyolefins, cyclic polyolefins, carboxylic acid-modified polyolefins and carboxylic acid-modified cyclic polyolefins.

Specific examples of the polyolefin include polyethylene such as low-density polyethylene, medium-density polyethylene, high-density polyethylene and linear low-density polyethylene; polypropylene such as homopolypropylene, block copolymers of polypropylene (e.g. block copolymers of propylene and ethylene) and random copolymers of polypropylene (e.g. random copolymers of propylene and ethylene); terpolymers of ethylene-butene-propylene; and the like. Among these polyolefins, polyethylenes and polypropylenes are preferred.

The cyclic polyolefin is a copolymer of an olefin and a cyclic monomer, and examples of the olefin as a constituent monomer of the cyclic polyolefin include ethylene, propylene, 4-methyl-1-pentene, styrene, butadiene and isoprene. Examples of the cyclic monomer as a constituent monomer of the cyclic polyolefin include cyclic alkenes such as norbornene, specifically cyclic dienes such as cyclopentadiene, dicyclopentadiene, cyclohexadiene and norbornadiene. Among these polyolefins, cyclic alkenes are preferred, and norbornene is further preferred.

The carboxylic acid-modified polyolefin is a polymer with the polyolefin modified by subjecting the polyolefin to block polymerization or graft polymerization with a carboxylic acid. Examples of the carboxylic acid to be used for modification include maleic acid, acrylic acid, itaconic acid, crotonic acid, maleic anhydride and itaconic anhydride.

The carboxylic acid-modified cyclic polyolefin is a polymer obtained by performing copolymerization with an α,β-unsaturated carboxylic acid or an anhydride thereof replacing a part of monomers that form the cyclic polyolefin, or by block-polymerizing or graft-polymerizing an α,β-unsaturated carboxylic acid or an anhydride thereof with the cyclic polyolefin. The cyclic polyolefin to be modified with a carboxylic acid is the same as described above. The carboxylic acid to be used for modification is the same as that used for modification of the acid-modified cycloolefin copolymer.

Among these resin components, carboxylic acid-modified polyolefins are preferred, and carboxylic acid-modified polypropylene is further preferred.

The sealant layer 4 may be formed from one resin component alone, or may be formed from a blend polymer obtained by combining two or more resin components. Further, the sealant layer 4 may be formed of only one layer, but may be formed of two or more layers with the same resin component or different resin components.

While the thickness of the sealant layer 4 may be appropriately selected, and it is, for example, 10 to 100 μm, preferably 15 to 50 μm.

[Adhesive Layer 5]

In the battery packaging material according to the present invention, the adhesive layer 5 is a layer that is provided between the metal layer 3 and the sealant layer 4 as necessary for strongly bonding these layers to each other.

The adhesive layer 5 is formed of an adhesive capable of bonding the metal layer 3 and the sealant layer 4 to each other. The bonding mechanism, the kind of the adhesive component, and so on for the adhesive to be used for formation of the adhesive layer 5 are similar to those for the adhesive layer 2. The adhesive component to be used in the adhesive layer 5 is preferably a polyolefin-based resin, further preferably a carboxylic acid-modified polyolefin, especially preferably carboxylic acid-modified polypropylene.

The thickness of the adhesive layer 5 is, for example, 2 to 50 μm, preferably 20 to 30 μm.

3. Method for Producing Battery Packaging Material

While the method for producing a battery packaging material according to the present invention is not particularly limited as long as a laminate in which layers each having a predetermined composition are laminated is obtained, for example the following method is shown as an example.

First, a laminate in which the base material layer 1, the adhesive layer 2 and the metal layer 3 are laminated in this order (hereinafter, the laminate may be described as a "laminate A") is formed. Specifically, the laminate A can be formed by a dry lamination method in which an adhesive to be used for formation of the adhesive layer 2 is applied onto the base material layer 1 or the metal layer 3, the surface of which is subjected to a chemical conversion treatment as necessary, using a coating method such as an extrusion method, a gravure coating method or a roll coating method, and dried, the metal layer 3 or the base material layer 1 is then laminated, and the adhesive layer 2 is cured.

Then, the sealant layer 4 is laminated on the metal layer 3 of the laminate A. When the sealant layer 4 is laminated directly on the metal layer 3, a resin component that forms the sealant layer 4 may be applied onto the metal layer 3 of the laminate A by a method such as a gravure coating method or a roll coating method. When the adhesive layer 5 is provided between the metal layer 3 and the sealant layer 4, mention is made of, for example, (1) a method in which the adhesive layer 5 and the sealant layer 4 are co-extruded to be laminated on the metal layer 3 of the laminate A (co-extrusion lamination method); (2) a method in which the adhesive layer 5 and the sealant layer 4 are laminated to form a laminate separately, and the laminate is laminated on the metal layer 3 of the laminate A by a thermal lamination method; (3) a method in which an adhesive for formation of the adhesive layer 5 is laminated on the metal layer 3 of the laminate A by an extrusion method or a method in which the adhesive is applied by solution coating, dried at a high temperature and baked, and the sealant layer 4 formed in a sheet shape beforehand is laminated on the adhesive layer 5 by a thermal lamination method; and (4) a method in which the melted adhesive layer 5 is poured between the metal layer 3 of the laminate A and the sealant layer 4 formed in a sheet shape beforehand, and simultaneously the laminate A and the sealant layer 4 are bonded together with the adhesive layer 5 interposed therebetween (sandwich lamination).

A laminate including the base material layer 1, the adhesive layer 2, the metal layer 3, the surface of which is subjected to a chemical conversion treatment as necessary, the adhesive layer 5 provided as necessary and the sealant layer 4 in this order is formed in the manner described above, and the laminate may be further subjected to a heating treatment such as that of heat roll contact type, hot air type or near- or far-infrared ray type, for enhancing the adhesion of the adhesive layer 2 and the adhesive layer 5 provided as necessary. As conditions for such a heating treatment, for example, the temperature is 150 to 250° C., and the time is 1 to 5 minutes.

In the battery packaging material according to the present invention, the layers that form the laminate may be subjected to a surface activation treatment such as a corona treatment, a blast treatment, an oxidation treatment or an ozone treatment as necessary for improving or stabilizing film formability, lamination processing and final product secondary processing (pouching and embossing molding) suitability, and the like.

4. Use of Battery Packaging Material

The battery packaging material according to the present invention is used as a packaging material for hermetically sealing and storing battery elements such as a positive electrode, a negative electrode and an electrolyte.

Specifically, a battery element including at least a positive electrode, a negative electrode and an electrolyte is covered with the battery packaging material according to the present invention such that a flange portion (region where sealant layers are in contact with each other) can be formed on the periphery of the battery element while a metal terminal connected to each of the positive electrode and the negative electrode protrudes to outside, and sealant layers at the flange portion are heat-sealed with each other, thereby providing a battery using a battery packaging material. When the battery element is stored using the battery packaging material according to the present invention, the battery packaging material according to the present invention is used such that the sealant portion is on the inner side (surface in contact with the battery element).

The battery packaging material according to the present invention may be used for either a primary battery or a secondary battery, but is preferably used for a secondary battery. The type of secondary battery to which the battery packaging material according to the present invention is applied is not particularly limited, and examples thereof include lithium ion batteries, lithium ion polymer batteries, lead storage batteries, nickel-hydrogen storage batteries, nickel-cadmium storage batteries, nickel-iron storage batteries, nickel-zinc storage batteries, silver oxide-zinc storage batteries, metal-air batteries, polyvalent cation batteries, condensers and capacitors. Among these secondary batteries, preferred subjects to which the battery packaging material according to the present invention is applied include lithium ion batteries and lithium ion polymer batteries.

EXAMPLE

The present invention will be described in detail below by showing examples and comparative examples. It is to be noted that the present invention is not limited to examples.

Examples 1 to 5 and Comparative Examples 1 and 2

Production of Battery Packaging Material

A battery packaging material including a laminate with a base material layer 1, an adhesive layer 2, a metal layer 3, an adhesive layer 5 and a sealant layer 4 laminated in this order was produced by laminating the adhesive layer 5 and the sealant layer 4 by a thermal lamination method to a laminate with the base material layer 1, the adhesive layer 2 and the metal layer 3 laminated in this order. Conditions for producing the battery packaging material are as shown below.

As an aluminum foil (AL foil) for forming the metal layer 3, one obtained by subjecting to a chemical conversion treatment both the surfaces of soft aluminum (JIS H4160 A8021H-O) having properties (0.2% yield strength, tensile rupture strength and tensile rupture elongation) as shown in Table 1 was used. The chemical conversion treatment of the AL foil was performed by applying to both the surfaces of the metal layer a treatment liquid including a phenol resin, a chromium fluoride compound and phosphoric acid using a roll coating method, and performing baking for 20 seconds under such conditions that the film temperature was 180° C. or higher. The 0.2% yield strength, tensile rupture strength and tensile rupture elongation of the AL foil were measured by a tensile test (total elongation method) defined in JIS Z 2241.

As a resin film for forming the base material layer 1, one having properties (tensile rupture strength and tensile rupture elongation) as shown in Table 2 was used. The tensile rupture strength and the tensile rupture elongation of each of resin films 1 and 2 are measured by a method conforming to JIS K7127.

TABLE 1

| | 0.2% Yield strength [N/mm2] | Tensile rupture strength (MD DIRECTION) [N/mm2] | Tensile rupture elongation (MD DIRECTION) [%] |
|---|---|---|---|
| AL foil 1 | 71 | 105 | 12 |
| AL foil 2 | 35 | 85 | 14 |
| AL foil 3 | 143 | 154 | 6 |

TABLE 2

|  |  | Tensile rupture strength [MPa] | | Tensile rupture elongation [%] | |
| --- | --- | --- | --- | --- | --- |
|  |  | MD | TD | MD | TD |
| Resin film 1 | Biaxially stretched nylon film | 270 | 336 | 122 | 100 |
| Resin film 2 | Biaxially stretched polybutylene terephthalate film | 207 | 250 | 142 | 105 |

The thicknesses of the base material layer 1 and the metal layer 3, and the ratio thereof in each of examples and comparative examples are as shown in Table 3. A laminate with the base material layer 1, the adhesive layer 2 and the metal layer 3 laminated in this order was prepared while the base material layer 1 and the metal layer 3 were combined as shown in Table 3. Specifically, the adhesive layer 2 composed of a two-liquid urethane adhesive including a polyester-based main agent and an isocyanate-based curing agent was formed in a thickness of 3 μm on one surface of the base material layer 1, and bonded (thermally laminated) to a chemically converted surface of the metal layer by pressurization and heating to prepare a laminate with the base material layer 1, the adhesive layer 2 and the metal layer 3 laminated in this order.

Separately, an acid-modified polypropylene resin [unsaturated carboxylic acid-graft-modified random polypropylene graft-modified with an unsaturated carboxylic acid] for forming the adhesive layer 5 and polypropylene [random copolymer (hereinafter, referred to as PP)] for forming the sealant layer 4 were co-extruded to prepare a two-layer co-extruded film composed of the 20 μm-thick adhesive layer 5 and the 20 μm-thick sealant layer 4.

The prepared two-layer co-extruded film was then superimposed on the prepared laminate including the base material layer 1, the adhesive layer 2 and the metal layer 3 in such a manner that the adhesive layer 5 of the two-layer co-extruded film was in contact with the metal layer of the laminate, and thermal lamination was performed by applying heat so that the temperature of the metal layer 3 was 120° C., thereby obtaining a laminate with the base material layer 1, the adhesive layer 2, the metal layer 3, the adhesive layer 5 and the sealant layer 4 laminated in this order. The obtained laminate was temporarily cooled, then heated to 180° C., and held at this temperature for 1 minute to be heat-treated, thereby obtaining a battery packaging material.

TABLE 3

|  | Configuration and thickness of base material layer 1 | Configuration and thickness of metal layer 3 | Thickness ratio (base material layer 1:metal layer 3) |
| --- | --- | --- | --- |
| Example 1 | Biaxially stretched nylon film (25 μm)/DL (3 μm)/Biaxially stretched nylon film (10 μm) | AL foil 1 (40 μm) | 1.0/1.1 |
| Example 2 | Biaxially stretched nylon film (25 μm) | AL foil 1 (40 μm) | 1.0/1.6 |
| Example 3 | Biaxially stretched nylon film (15 μm) | AL foil 1 (35 μm) | 1.0/2.3 |
| Example 4 | Biaxially stretched nylon film (15 μm) | AL foil 1 (40 μm) | 1.0/2.7 |
| Example 5 | Biaxially stretched polybutylene terephthalate film (20 μm) | AL foil 1 (40 μm) | 1.0/2.0 |
| Comparative Example 1 | Biaxially stretched nylon film (15 μm) | AL foil 2 (35 μm) | 1.0/2.3 |
| Comparative Example 2 | Biaxially stretched nylon film (15 μm) | AL foil 3 (35 μm) | 1.0/2.3 |

<Evaluation of Moldability>

The obtained battery packaging material obtained as described above was cut to prepare a strip piece of 120×80 mm, and the strip piece was used as a test sample. A straight mold including a rectangular male mold of 30×50 mm, and a female mold with a clearance of 0.5 mm from the male mold was provided, the test sample was placed on the female mold in such a manner that the heat-adhesive resin layer was situated on the male mold side, the test sample was pressed at a pressing pressure (surface pressure) of 0.1 MPa in such a manner that the molding depth was 6 mm or 7 mm, and cold molding (draw-in one-step molding) was performed. Presence/absence of pinholes and cracks in the metal layer in the molded battery packaging material was checked, and the ratio of generation (%) of pinholes and cracks was calculated. For the ratio of generation of pinholes and cracks, a test sample having at least one pinhole or crack after being molded as described above was discriminated as a molding defective product, and the ratio of molding defective products occurring at the time of molding 30 test samples under the above-mentioned conditions was determined. The results are shown in Table 4.

TABLE 4

|  | Molding depth 6 mm | Molding depth 7 mm |
| --- | --- | --- |
| Example 1 | 0 | 3 |
| Example 2 | 0 | 0 |
| Example 3 | 0 | 0 |
| Example 4 | 0 | 3 |
| Example 5 | 0 | 6 |
| Comparative Example 1 | 13 | 34 |
| Comparative Example 2 | 58 | 100 |

The results shown in Table 4 show that when molded under a severe condition, i.e. at a molding depth of 6 mm, the battery packaging materials of Examples 1 to 5 in which an aluminum foil having a high yield strength with a 0.2% yield strength of 55 to 140 N/mm$^2$ in a direction parallel to a rolling direction was used as a metal layer, and the ratio of the thickness of the base material layer 1 to the thickness of the metal layer 3 was set in the range of 1:1 to 1:3 had no pinholes and cracks at all, so that generation of pinholes and cracks was remarkably suppressed. When molded at a molding depth of 6 mm, the battery packaging material of Comparative Examples 1 and 2 produced using an aluminum foil having 0.2% yield strengths of less than 55 N/mm$^2$ or more than 140 N/mm$^2$ had a high ratio of generation of pinholes and cracks, and were thus inferior in moldability to the battery packaging materials of Examples 1 to 5. Further, when the battery packaging material was molded under a severe condition, i.e. at a molding depth of 7 mm, pinholes and cracks were remarkably suppressed in Examples 1 to 5, but the battery packaging materials of Comparative Examples 1 and 2 had a high ratio of generation of pinholes and cracks, and were thus inferior in moldability to the battery packaging materials of Examples 1 to 5.

DESCRIPTION OF REFERENCE SIGNS

1: Base material layer
2: Adhesive layer
3: Metal Layer
4: Sealant layer
5: Adhesive layer

The invention claimed is:

1. A battery packaging material comprising a laminate in which at least a base material layer, an adhesive layer, a metal layer and a sealant layer are laminated in this order, wherein the metal layer is an aluminum foil having a 0.2% yield strength of 55 to 140 $N/mm^2$ when a tensile test is conducted in a direction parallel to a rolling direction, and the ratio of the thickness of the base material layer to the thickness of the metal layer (thickness of base material layer:thickness of metal layer) is in the range of 1:1 to 1:3.

2. The battery packaging material according to claim 1, wherein the base material layer is formed of at least one of a polyester resin and a polyamide resin.

3. The battery packaging material according to claim 1, wherein the aluminum foil has a 0.2% yield strength of 55 to 140 $N/mm^2$ when a tensile test is conducted in a direction vertical to a rolling direction.

4. The battery packaging material according to claim 1, wherein the aluminum foil has a 0.2% yield strength of 55 to 140 $N/mm^2$ when a tensile test is conducted in a direction at 45° to a rolling direction.

5. The battery packaging material according to claim 1, wherein at least one surface of the metal layer is subjected to a chemical conversion treatment.

6. The battery packaging material according to claim 1, wherein the battery packaging material is a packaging material for a secondary battery.

7. A battery comprising a battery element comprising at least a positive electrode, a negative electrode and an electrolyte, the battery element being stored in the battery packaging material according to claim 1.

8. A method comprising: packaging a battery element in a battery packaging material, of a laminate in which at least a base material layer, an adhesive layer, a metal layer and a sealant layer are laminated in this order, wherein the metal layer is an aluminum foil having a 0.2% yield strength of 55 to 140 $N/mm^2$ when a tensile test is conducted in a direction parallel to a rolling direction, and the ratio of the thickness of the base material layer to the thickness of the metal layer (thickness of base material layer:thickness of metal layer) is in the range of 1:1 to 1:3.

9. A method for producing a battery, the method including the step of: storing in a battery packaging material a battery element including at least a positive electrode, a negative electrode and an electrolyte, the battery packaging material including a laminate in which at least a base material layer, an adhesive layer, a metal layer and a sealant layer are laminated in this order, wherein the metal layer is an aluminum foil having a 0.2% yield strength of 55 to 140 $N/mm^2$ when a tensile test is conducted in a direction parallel to a rolling direction, and the ratio of the thickness of the base material layer to the thickness of the metal layer (thickness of base material layer:thickness of metal layer) is in the range of 1:1 to 1:3.

* * * * *